May 25, 1937.  E. H. CORDES  2,081,323
TOGGLE BOLT
Filed May 8, 1936
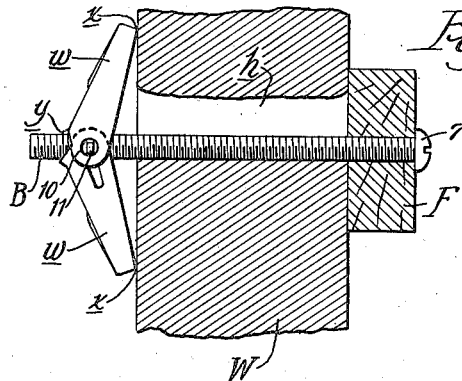
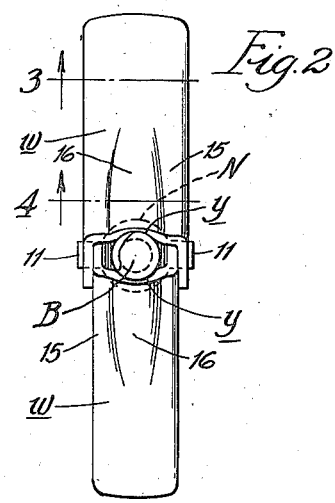
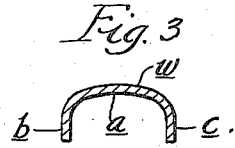
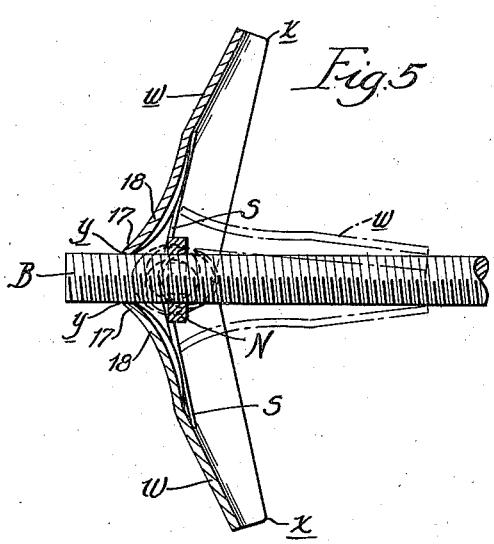
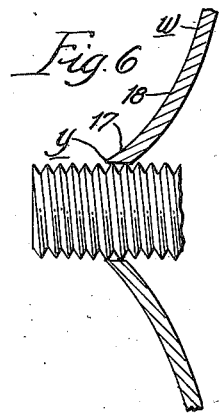
Inventor:
Edward H. Cordes,
By Banning & Banning
Attys.

Patented May 25, 1937

2,081,323

UNITED STATES PATENT OFFICE 2,081,323

TOGGLE BOLT

Edward H. Cordes, Plainfield, N. J., assignor to U. S. Expansion Bolt Co., New York, N. Y., a corporation of New York Application May 8, 1936, Serial No. 78,659

1 Claim. (Cl. 85—3)

This invention relates to a toggle bolt of the spring-actuated double-wing type, such as is adapted to support an object or fixture upon a hollow wall or ceiling.

It is an object of my invention to combine with a bolt a toggle head comprising a pair of pivotally mounted wings each of channeled form with appropriate tension means for distending the wings into nearly transverse positions upon opposite sides of the bolt. When distended, the outwardly swung ends of the wings become bearing points which engage with the wall surface which is to sustain the load that is carried by the bolt. The limit of distending movement is reached when the inner ends of the two wings engage with the bolt at a point which is sufficiently distant from the pivotal center of the wings to effectively sustain the load which the wings are required to carry.

In the preferred embodiment of my invention, the wings are pivotally mounted upon oppositely extending trunnions carried upon a nut which is screw-threaded upon the bolt. Such a nut is desirably loosely fitted upon the threads of the bolt so as to rotate freely thereupon, and is also of minimum size in order to lie within the channels of the wings which are relatively narrow. Because of the loose fit of the nut upon the bolt and the small amount of stock utilized for the nut, it is desirable to transfer to the bolt a large part of the load which otherwise would be imposed on the nut. This objective I accomplish by means incorporated in the wings, such means acting both to strengthen the walls thereof and to cause engagement of these walls with a plurality of threads upon the bolt, all with a consequential diminution in the load which the nut is required to carry.

An exemplification of this invention is set forth in the accompanying drawing wherein—

Figure 1 is a transverse section through a wall having a hole wherein the toggle bolt, here shown in elevation, is extended to support certain work upon an exterior face of the wall;

Fig. 2 is an enlarged view in elevation looking toward the end of the toggle head;

Figs. 3 and 4 are transverse sections taken, respectively, on lines 3 and 4 of Fig. 2;

Fig. 5 is a longitudinal section through the toggle head distended to engage the bolt threads which are shown in elevation; and Fig. 6 is a detail in elevation of the end portion of the bolt showing in longitudinal section the engaging portion of the toggle head, the scale of this figure being somewhat enlarged.

Referring to Figure 1, I have shown a wall W through which is a hole $h$ for receiving a bolt B having a fixed head 7 in engagement with the work F which may be a fixture or other object. Pivotally associated with the bolt and disposed at the end thereof which is opposite its fixed head, is the present toggle head comprising a pair of wings $w$ which may be identical except as to width. As shown, each wing is of channeled form with a center wall $a$ from opposite sides of which extend flanges $b$ and $c$ whose outer extremities form bearing points $x$. The width of one wing is slightly greater than that of the other so as to accommodate the flanges of the one within the other (see Figure 2). These interfitting flanges are provided with registering openings 10 through which are extended oppositely disposed trunnions 11 projecting from a nut N which is threaded upon the bolt. From the folded down position, shown by dotted lines in Fig. 5, the wings are adapted to swing outwardly to a distended position with the aid of a wire spring S which is coiled around one of the trunnions to present its opposite ends against the under face of the center wall of each wing. Adjacent its inner end each center wall is cut away to accommodate the bolt which is extended therebetween (see Fig. 5), engagement of the wings with the bolt taking place when the toggle head is fully distended.

Referring now to Figs. 2, 3 and 4, it will be observed that the center wall of each wing is depressed between the side flanges and longitudinally and transversely curved from said depressed portion to its inner extremity. As indicated best in Fig. 4, this contour changes toward the inner end of each wing where I provide adjacent the sides of the center wall of the wing a pair of longitudinal ribs between which is a narrow outwardly bowed arch 16. At the extremity of each wing is a curved neck 17 formed at the end of a longitudinal flare 18 of its center wall between the spaced ribs 15. The result is a central opening between the wings having a generally circular contour such as will closely fit the bolt which is extended therebetween. In addition, the flared end of each wing will approach the bolt to present its neck in engagement therewith at an angle which is relatively easy, as distinguished from a sharp angle which would otherwise obtain, and such engagement will take place at $y$ upon the outer edges of a plurality of threads instead of between the threads as in the past.

In practice, the bolt with toggle head in folded condition is passed through a hole in the wall and upon reaching the far side the pivoted wings automatically distend. It is now necessary to rotate the bolt sufficiently to tighten the work in place. In doing this the inner extremities of the wings engage with the bolt, thereby developing a friction which tends to produce rotation of the toggle head as well. This friction, however, is maintained at a minimum by reason of the special contour of the inner extremities of the wings which approach the bolt with an easy angle and present a sufficient area of contact surface to engage with two or more bolt threads at outermost points thereupon. The resulting friction is accordingly so light that the bolt may easily be rotated without imparting a corresponding motion to the toggle head. When fully tightened, the thrust forces proceeding from bearing points $x$ to the bolt engaging points $y$ will be resisted effectively by the reinforcing ribs 15 which extend up or close to the wing necks, as already described. Each neck is further reinforced in its middle region by the bowed arch 16 which merges thereinto. Accordingly, in a simple and effective manner I have provided a construction in which (1) the wings engage the bolt with a relatively light friction and (2) the wings are rendered amply strong to sustain the imposed load with only a minimum of contribution on the part of the associated nut. This is of advantage since it obviates cutting of the threads by a relatively narrow edge of each wing and preserves the parts in a condition for release of the bolt from the toggle head, should it be desired to remove the work from the wall to which it is applied.

I claim:

A toggle bolt comprising, a threaded bolt, a nut threaded on the bolt, and channeled sheet metal wings pivotally mounted on the nut to lie upon opposite sides of the bolt, the center wall of each wing being depressed between its side flanges and longitudinally and transversely curved from said depressed portion to its inner extremity providing a relatively rigid and upwardly curving neck portion adapted to engage a substantial portion of the threaded bolt, and tension means urging the wings to a distended position for frictionally engaging said neck portions with the bolt.

EDWARD H. CORDES.